2,899,460
PURIFICATION OF ALKARYL SULFONIC ACIDS

Roy C. Sias and Warren W. Woods, Ponca City, Okla., assignors to Continental Oil Company, Ponca City, Okla., a corporation of Delaware No Drawing. Application February 20, 1956
Serial No. 566,334

12 Claims. (Cl. 260—505)

The present invention is concerned with an improved process for the preparation of alkaryl sulfonic acids and more particularly with the preparation of oil soluble alkaryl sulfonic acids which are substantially free of oxides of sulfur and hydrates of the same.

In the production of alkaryl sulfonic acids an alkaryl hydrocarbon is treated with a sulfonating agent such as sulfuric acid, oleum, sulfur trioxide, etc. Whichever method is used, an excess of the sulfur oxides will remain both dissolved and dispersed in the product as $SO_2$, $SO_3$, or their hydrates which are difficult if not impossible to remove by the methods of the prior art. In general, it has been assumed that sulfonic acids themselves cannot be prepared in a state even approaching purity and as a consequence they are isolated and purified in the form of their sodium salts. Obviously, if a sulfonic acid containing these impurities is neutralized by treatment with a base such as an alkali hydroxide these contaminants are converted to alkali sulfates and sulfites. These inorganic salts are not oil soluble and result in turbidity of the oil soluble sulfonate solution. Because of the dispersing ability of the sulfonate, removal of the salts at this stage has been found extremely difficult. It has been found possible to purify the crude sulfonate by alcoholic extraction; however this process is expensive. Various methods have been proposed for the alternative purification of sulfonic acids themselves, including stratification follow ing dilution with solvents, filtration, centrifugation, air blowing and the like. In one method proposed, the sulfonic acid mixture is treated with filter aid to remove sludge, tar, free sulfuric acid, and other finely divided organic and inorganic acids and solids known collectively as "pepper sludge." While such methods are satisfactory for the removal of dispersed particles or dispersed liquids, they are not effective for the removal of dissolved sulfur trioxide, or its hydrates.

It is, therefore, a principal object of this invention to provide a process which will obviate the disadvantages of the prior art processes. A further object of the present invention is to provide an improved process for the removal of collodially dispersed particles and dissolved sulfur dioxide, sulfur trioxide and/or their hydrates contained in crude sulfonic acids. Further objects and advantages of the invention will be apparent to those skilled in the art from the accompanying disclosure and discussion.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a process for the preparation of oil-soluble alkaryl sulfonic acids, which in the crude form are contaminated with sulfur dioxide and/or sulfur trioxide and the hydrates of the same, that are substantially free of the foregoing contaminants which comprises:

a. Adding to the crude sulfonic acid a precipitating agent which will react with the contaminants forming insoluble materials wherein said precipitating agent is added in amount varying from 1 to 2 times the stoichiometric quantity required for reaction with said contaminants, and then b. Recovering from the resulting mixture the alkaryl sulfonic acid.

If the crude sulfonic acid contains sulfur dioxide, sulfuric trioxide, and their hydrates these contaminants may be removed by either one of two methods. Method one comprises:

a. Adding to the crude sulfonic acid a nitrogen-containing compound which upon reaction with the contaminants forms a precipitate wherein the nitrogen-containing compound is added in an amount varying from 1 to 2 times the stoichiometric quantity required for the reaction with said contaminants, and then b. Recovering from the resulting mixture the alkaryl sulfonic acid.

Although the foregoing method is effective for removing the sulfur dioxide, sulfur trioxide, and their hydrates, we prefer, for economic reasons, to employ an alternative method comprising:

a. Adding to the crude sulfonic acid an inorganic basic compound having an ionization constant $K_b$ greater than $1 \times 10^{-14}$, a solubility of less than 1 part in 100 parts of water, and which reacts with sulfur trioxide and its hydrate to form a water-insoluble salt wherein said basic inorganic compound is added in amount varying from 1 to 2 times the stoichiometric quantity required for the reaction with the sulfur trioxide and its hydrates contained therein, then adding a nitrogen-containing compound which upon reaction with sulfur dioxide and its hydrate forms a precipitate wherein said nitrogen-containing compound is added in amount varying from 1 to 2 times the stoichiometric quantity required for the reaction with the sulfur dioxide and its hydrate contained therein, and then b. Recovering from the resulting mixture the alkaryl sulfonic acid.

In the special case where the crude sulfonic acid is free of sulfur trioxide and its hydratet but contaminated with sulfur dioxide and its hydrate, the invention comprises:

a. Adding to the crude sulfonic acid a nitrogen-containing compound which upon reaction with sulfur dioxide and its hydrate forms a precipitate wherein said nitrogen-containing compound is added in an amount varying from 1 to 2 times the stoichiometric quantity required for the reaction with the sulfur dioxide and the hydrate of the same, and then b. Recovering from the resulting mixture the alkaryl sulfonic acid.

If the product is substantially free of sulfur dioxide and its hydrate but is contaminated with sulfur trioxide and its hydrate, the invention comprises:

a. Adding to the crude sulfonic acid an inorganic basic compound having an ionization constant $K_b$ greater than $1 \times 10^{-14}$, a solubility of less than 1 part in 100 parts of water and which reacts with sulfuric acid to form a water-insoluble salt wherein said inorganic compound is added in an amount varying from 1 to 2 times the stoichiometric quantity required for the reaction with the sulfur trioxide and the hydrate of the same, and then b. Recovering from the resulting mixture the alkaryl sulfonic acid.

It will, of course, be obvious to those skilled in the art that the invention defined above may be practiced in a variety of ways, as for example, the alkaryl sulfonic acid may be recovered from the mixture by filtration, centrifugation, decantation, or similar process.

As used herein and in the appended claims, suitable precipitating agents or compounds are those compounds that will react with the contaminants sulfur dioxide, sulfur trioxide, or their hydrates, to form a product insoluble in sulfonic acid. Such compounds include both inorganic bases and nitrogen-containing compounds. The specific inorganic basic compound selected must have an ionization constant $K_b$ greater than $1 \times 10^{-14}$, have a solubility in water of less than 1 part per 100 parts of water, and must react with sulfuric acid to form a water insoluble salt. Specifically suitable basic inorganic compounds include oxides, hydroxides and carbonates of calcium, barium and strontium. Suitable nitrogen compounds include all those having the structure

wherein X, Y, and Z may be the same or different and represent a radical selected from the group consisting of hydrogen, hydrocarbons, and both inorganic and organic radicals containing a terminal carbonyl linkage with the further restriction that at least one of these groups represent hydrogen.

Specific suitable compounds are as follows:

Primary amines such as methyl amine, ethyl amine, propyl amine, butyl amine, aniline, toluidine, xylidines, cyclohexyl amine, etc.

Secondary amines such as dimethylamine, diethylamine, dipropylamine and other dialkylamines and mixed dialkylamines. Also secondary amines such as methyl aniline, diethyl xylidine, dimethyl cyclohexyl amine.

Hetrocyclic amines such as tetrahydropyrrole, pyridine, piperidine, quinoline, etc.

Amides such as N-methyl acetamide, propionamide, benzamide, acetanilide, urea, methyl urea, dimethyl urea.

The sulfonic acids which can be treated successfully by the processes of our invention may be derived from a variety of hydrocarbon sources. Because of its availability and commercial importance, the treatment of crude postdodecylbenzene sulfonic acid obtained by the sulfonation of postdodecylbenzene will be illustrated here. Postdodecylbenzene consists of monoalkylbenzenes and dialkylbenzenes in the approximate ratio of 2:3. Its typical properties are as follows:

Specific gravity at 38° C. _____ 0.8649
Average molecular weight _____ 365
Percent sulfonatable _____ 88
A.S.T.M., D–158 Engler:
    I.B.P. _____ °F__ 647
    5 _____ °F__ 682
    50 _____ °F__ 715
    90 _____ °F__ 760
    95 _____ °F__ 775
    F.B.P. _____ °F__ 779
Refractive index at 23° C. _____ 1.4900
Viscosity at: −10° C. _____ centipoises__ 2800
    20° C. _____ 280
    40° C. _____ 78
    80° C. _____ 18
Aniline point _____ °C__ 69
Pour point _____ °F__ −25

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and scope of the appended claims. All parts are by weight.

EXAMPLE 1

To 100 parts of crude postdodecylbenzene sulfonic acid was added one part of various clays, the mixture was agitated for one hour at ambient temperature and then allowed to settle over night. A sample of the treated supernatant sulfonic acid was decanted and analyzed. Analysis of the postdodecylbenzene sulfonic acid both untreated and treated with 1 percent of various clays and filter earths is given in Table 1.

Examination of Table 1 shows that all clays and filter earths used in the treatment of a crude postdodecylbenzene sulfonic acid resulted in a treated product having an improvement ratio below 2.00.

Table 1

TREATMENT OF POSTDODECYLBENZENE SULFONIC ACID WITH ONE PERCENT OF VARIOUS CLAYS AND FILTER EARTHS

| Exp. No. | Clay | Analysis of Sulfonic Acid | | Results of Treatment | |
|---|---|---|---|---|---|
| | | Sulfonic Acid, Meq./g. | Inorganic Acids,[1] Meq./g. | Acid Ratio[2] | Improvement Ratio[3] |
| 1 | Blank | 0.571 | 0.193 | 0.338 | |
| 2 | Attapulgus | 0.570 | 0.102 | 0.179 | 1.89 |
| 3 | Filtrol | 0.572 | 0.109 | 0.190 | 1.78 |
| 4 | J.M. Celite (30–60 mesh) | 0.580 | 0.117 | 0.202 | 1.68 |
| 5 | J.C. Celite (60 mesh) | 0.576 | 0.124 | 0.215 | 1.57 |
| 6 | Dicalite 4200 | 0.569 | 0.146 | 0.257 | 1.31 |
| 7 | Hy Flo | 0.570 | 0.159 | 0.278 | 1.21 |
| 8 | Super Aid | 0.575 | 0.107 | 0.186 | 1.82 |

[1] Oxides of sulfur and hydrates of the same.
[2] Acid Ratio = $\frac{\text{meq./g. Inorganic Acids}}{\text{meq./g. Sulfonic Acids}}$
[3] Improvement Ratio = $\frac{\text{Acid Ratio of Untreated Acids}}{\text{Acid Ratio of Treated Acid}}$

EXAMPLE 2

Table 2 gives the results of a number of experiments in which various precipitants were used in accordance with the process of this invention for the removal of inorganic acids from a crude postdodecylbenzene sulfonic acid containing both $SO_2$ and $SO_3$.

Table 2

TREATMENT OF CRUDE POSTDODECYLBENZENE SULFONIC ACID WITH VARIOUS AMOUNTS OF PRECIPITATING AGENTS

| Exp. No. | Precipitant | Analysis of Sulfonic Acid | | Acid Ratio[2] | Improvement Ratio[3] |
|---|---|---|---|---|---|
| | | Sulfonic Acid, Meq./g. | Inorganic Acids, Meq./g. | | |
| 1 | Blank | 0.571 | 0.193 | 0.338 | |
| 9 | CaO 1.0 eq | 0.583 | 0.051 | 0.087 | 3.89 |
| 10 | Ca(OH)₂ 1.0 eq | 0.572 | 0.106 | 0.185 | 1.82 |
| 11 | Ca(OH)₂ 2.0 eq | 0.578 | 0.084 | 0.145 | 2.32 |
| 12 | BaCO₃ 3.0 eq | 0.571 | 0.032 | 0.056 | 6.02 |
| 13 | Urea 1.0 eq | 0.557 | 0.020 | 0.036 | 9.38 |
| 14 | Urea 1.5 eq | 0.553 | 0.022 | 0.040 | 8.45 |
| 15 | Urea 2.0 eq | 0.565 | 0.016 | 0.028 | 12.08 |
| 16 | Benzamide 1.0 eq | 0.572 | 0.019 | 0.034 | 9.95 |
| 17 | Benzamide 1.5 eq | 0.561 | 0.013 | 0.023 | 14.69 |
| 18 | Benzamide 2.0 eq | 0.571 | 0.009 | 0.016 | 21.02 |
| 19 | Diethyl Amine 1.0 eq | 0.581 | 0 | 0.0 | Infinite |
| 20 | Mono Tert butyl Amine 1.0 eq | 0.596 | 0.013 | 0.022 | 5.3 |
| 21 | Triethyl amine 2.0 eq | 0.534 | 0.091 | 0.170 | 1.97 |

[2],[3] See footnotes for Table 1.

By comparison of the data of Tables 1 and 2, it is seen that treatment of crude sulfonic acid with clays and filter earths, in general, produces a reduction in the inorganic acid content as expressed by the Improvement Ratio of below 2. When treated with the suitable organic precipitants in accordance with the process of this invention, the Improvement Ratio is above 5. The precipitant used in Example 21, triethyl amine, does not fall under the definition of suitable precipitants and can be seen to give an Improvement Ratio below 2. Inorganic precipitants show some improvement even though this crude acid contained considerable quantities of $SO_2$ which is not removed by such precipitants.

In another set of experiments, the sulfur dioxide was removed by blowing the products of Exp. Nos. 2, 4, 9, 10, 11, 12 and 18 with an inert gas. Table 3 compares the analysis of these products.

Table 3

REMOVAL OF $SO_2$ BY GAS BLOWING AFTER TREATMENT WITH PRECIPITANTS

| Exp. No. | Precipitant | Analysis of Sulfonic Acid | | Acid Ratio | Overall Improvement Ratio |
|---|---|---|---|---|---|
| | | Sulfonic Acid, Meq./g. | Inorganic Acid, Meq./g. | | |
| 22 | Attapulgus | 0.572 | 0.098 | 0.171 | 1.93 |
| 23 | J. M. Celite | 0.564 | 0.101 | 0.179 | 1.89 |
| 24 | CaO 1.0 eq | 0.583 | 0.012 | 0.021 | 16.1 |
| 25 | Ca(OH)$_2$ 1.0 eq | 0.575 | 0.008 | 0.014 | 24.1 |
| 26 | Ca(OH)$_2$ 2.0 eq | 0.578 | 0.003 | 0.005 | 67.5 |
| 27 | BaCO$_3$ 3.0 eq | 0.571 | 0.015 | 0.027 | 12.5 |
| 28 | Benzamide 2.0 eq | 0.572 | 0.0 | 0 | Infinite |

It is seen from Table 3, that treatment of crude sulfonic acid with clays and filter earths followed by blowing with an inert gas for $SO_2$ removal, in general, produces a reduction in the inorganic acid content as expressed by the Improvement Ratio of below 2. When treated with inorganic or organic precipitants in accordance with the process of this invention followed by sulfur dioxide removal, the Improvement Ratio is above 10.

EXAMPLE 3

One hundred parts of postdodecylbenzene sulfonic acid (described in Example 1) was initially blown with an inert gas for one hour to remove sulfur dioxide. The resulting postdodecylbenzene sulfonic acid (0.544 meq./g. sulfonic acid, 0.071 meq./g. inorganic acid, acid ratio 0.131) was then treated with 1.5 equivalents of Ca(OH)$_2$ for one hour and then allowed to settle overnight. A sample of the treated supernatant sulfonic acid was decanted and analyzed. The sulfonic acidity of the product was 0.560 meq./g., 0.008 meq./g. inorganic acids, acid ratio 0.014. This gave an Overall Improvement Ratio of 24.1, indicating that good results can be obtained whether $SO_2$ removal is performed prior to or after treatment with an inorganic base.

EXAMPLE 4

Three hundred parts of postdodecylbenzene sulfonic acid having a total acidity of 0.764 meq./g. and 0.571 meq./g. of sulfonic acid with an acid ratio of .338 was treated with 2.0 equivalents of calcium hydroxide for 30 minutes and then allowed to settle over night. A sample of the treated supernatant sulfonic acid was decanted and analyzed. The treated product had a total acidity of 0.662 meq./g., sulfonic acid content of 0.578 meq./g., and an acid ratio of .145. The postdodecylbenzene sulfonic acid treated as above was then further treated with the organic precipitants shown in Table 4.

Table 4

TREATMENT OF CRUDE POSTDODECYLBENZENE SULFONIC ACID WITH Ca(OH)$_2$ AND VARIOUS ORGANIC PRECIPITANTS

| Exp. No. | Organic Precipitants | Analysis of Sulfonic Acid | | Acid Ratio | Improvement Ratio |
|---|---|---|---|---|---|
| | | Sulfonic Acid, Meq./g. | Inorganic Acids, Meq./g. | | |
| 11 | Blank [1] | 0.578 | 0.084 | 0.145 | 2.32 |
| 31 | Urea 0.5 eq | 0.563 | 0.014 | 0.025 | 13.5 |
| 32 | Urea 2.0 sq | 0.564 | 0.010 | 0.017 | 19.8 |
| 33 | Benzamide 1.0 eq | 0.567 | 0.020 | 0.036 | 99.4 |
| 34 | Benzamide 2.0 eq | 0.566 | 0.003 | 0.006 | 56.4 |
| 35 | Aniline 1.0 eq | 0.580 | 0.002 | 0.003 | 112 |
| 36 | Diphenyl amine 1.0 eq | 0.562 | 0.029 | 0.051 | 6.7 |
| 37 | Triethyl amine 1.0 eq | 0.547 | 0.053 | 0.097 | 3.5 |

[1] Treated with Ca(OH)$_2$ alone.

Examination of the data of Table 4 and comparison with data of Tables 2 and 3 indicates that very high improvement ratios can be obtained by a variety of methods. If $SO_2$ is removed by degassing either prior to or after treatment, excellent results are obtained with either organic or inorganic precipitants. Organic precipitants such as benzamide can be used with reasonable success on acid containing both $SO_2$ and $SO_3$. Treatment of such acid with both an inorganic and an organic precipitant also gives excellent results. It will be noted in Example 37, that use of a nitrogenous precipitant exempted from suitability by the structure again gives inferior results.

To illustrate and define the type of inorganic bases useful in this invention further, the following experiments were performed with both suitable and unsuitable precipitants. Experimental conditions and procedure were as outlined for Experiment Nos. 22 through 30. The inorganic bases used are classed as follows: (1) water soluble base yielding a water soluble salt, (2) water soluble base yielding a water insoluble salt, (3) water insoluble base yielding a water soluble salt, and (4) water insoluble base yielding a water insoluble salt. The results from these experiments are given in the following table:

Table 5

| Exp. No. | Class No. | Precipitant | Sulfonic Acid, Meq./g. | Total Acid,[1] Meq./g. | Residual Percent Metal in Treated Sulfonic Acid |
|---|---|---|---|---|---|
| 26 | 4 | Ca(OH)$_2$ 2.0 eq | 0.578 | 0.581 | nil. |
| 27 | 4 | BaCO$_3$ 3.0 eq | 0.571 | 0.586 | nil. |
| 38 | 1 | NaOH 0.7 eq | 0.563 | 0.511 | 0.07 |
| 39 | 1 | Na$_2$CO$_3$ 0.7 eq | 0.570 | 0.498 | 0.08 |
| 40 | 2 | Ba(OH)$_2$ 3.0 eq | 0.568 | 0.469 | 0.12 |
| 41 | 3 | MgO 1.0 eq | 0.557 | 0.530 | 0.07 |
| 42 | 3 | MgO 2.0 eq | 0.581 | 0.479 | |
| 43 | 3 | Mg(OH)$_2$ 1.0 eq | 0.572 | 0.553 | 0.06 |
| 44 | 3 | Mg(OH)$_2$ 2.0 eq | 0.569 | 0.474 | 0.11 |

[1] Total acid=sulfonic acid+inorganic acids.

It is apparent from the data presented in Table 5 that inorganic bases classed as 1, 2 and 3 are not suitable in the process of this invention. These bases give high residual metal contents; thus, contaminating the sulfonic acid. This contamination is the result both of formation of inorganic salt soluble in the sulfonic acid and of partial neutralization of the sulfonic acid itself to form a soluble metal sulfonate. This is illustrated by analysis obtained as total acid and sulfonic acid. The technique used to determine sulfonic acidity also detects neutral sulfonates, whereas that technique used for total acidity does not indicate neutral material. Consequently, the cases in Table 5 where sulfonic acidity is greater than total acidity represent substantial inclusion of metal sulfonates in the treated sulfonic acid. This indication is confirmed by the analyses shown for metal content of the treated sulfonic acid.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A process of separating a purified oil soluble alkaryl sulfonic acid from a mixture containing as contaminants oxides of sulfur and hydrates of the same which comprises (a) Adding to the crude sulfonic acid an organic nitrogen-containing compound having the structure:

wherein X represents a radical selected from the group consisting of hydrogen, lower alkyl, and phenyl radicals, and wherein Y represents a radical selected from the group consisting of lower alkyl, phenyl, lower-alkyl carbonyl, aminocarbonyl, lower-alkyl-amino-carbonyl and benzoyl, with the further restriction that said radicals containing a carbonyl group are attached by the carbonyl carbon to the nitrogen of said organic nitrogen-containing compound, said nitrogen-containing compound being added in an amount varying from 1 to 2 times the stoichiometric quantity required for reaction with said contaminants, and then (b) Recovering from the resulting mixture the alkaryl sulfonic acid.

2. A process of separating a purified oil-soluble alkaryl sulfonic acid from a mixture containing as contaminants sulfur trioxide and its hydrate which comprises: (a) Adding to the crude sulfonic acid an inorganic basic compound having an ionization constant $K_b$ greater than $1 \times 10^{-14}$, a solubility of less than 1 part in 100 parts of water and which reacts with sulfuric acid to form a water-insoluble salt wherein said inorganic compound is added in an amount varying from 1 to 2 times the stoichiometric quantity required for the reaction with the sulfur trioxide and the hydrate of the same, and then (b) Recovering from the resulting mixture the alkaryl sulfonic acid.

3. A process of separating a purified oil soluble alkaryl sulfonic acid from a mixture containing as contaminants oxides of sulfur and hydrates of the same which comprises: (a) Adding to the crude sulfonic acid an inorganic basic compound having an ionization constant $K_b$ greater than $1 \times 10^{-14}$, a solubility of less than 1 part in 100 parts of water, and which reacts with sulfuric acid to form a water-insoluble salt in an amount varying from 1 to 2 times the stoichiometric quantity required for the reaction with the sulfur trioxide and hydrate of the same contained in said crude sulfonic acid, and adding to the crude sulfonic acid a nitrogen-containing organic compound having the structure:

wherein X represents a radical selected from the group consisting of hydrogen, lower alkyl, and phenyl radicals, and wherein Y represents a radical selected from the group consisting of lower alkyl, phenyl, lower-alkyl carbonyl, aminocarbonyl, lower-alkyl-aminocarbonyl and benzoyl, with the further restriction that said radicals containing a carbonyl group are attached by the carbonyl carbon to the nitrogen of said organic nitrogen-containing compound, said nitrogen-containing compound being added in an amount varying from 1 to 2 times the stoichiometric quantity required for the reaction with the sulfur dioxide and the hydrate of the same contained in said crude sulfonic acid, and then (b) Recovering from the resulting mixture the alkaryl sulfonic acid.

4. The process of claim 1 wherein the nitrogen-containing compound is a primary amine.

5. The process of claim 1 wherein the nitrogen-containing compound is a secondary amine.

6. A process of separating a purified oil soluble alkaryl sulfonic acid from a mixture containing as contaminants oxides of sulfur and hydrates of the same which comprises: (a) Adding urea to the crude sulfonic acid in an amount varying from 1 to 2 times the stoichiometric quantity required for reaction with said contaminants, and then (b) Recovering from the resulting mixture the alkaryl sulfonic acid.

7. A process of separating a purified oil soluble alkaryl sulfonic acid from a mixture containing as contaminants oxides of sulfur and hydrates of the same which comprises: (a) Adding benzamide to the crude sulfonic acid in an amount varying from 1 to 2 times the stoichiometric quantity required for reaction with said contaminants, and then (b) Recovering from the resulting mixture the alkaryl sulfonic acid.

8. A process of separating a purified oil soluble alkaryl sulfonic acid from a mixture containing as contaminants sulfur trioxide and its hydrate which comprises: (a) Adding calcium oxide to the crude sulfonic acid in an amount varying from 1 to 2 times the stoichiometric quantity required for the reaction with sulfur trioxide and the hydrate of the same, and then (b) Recovering from the resulting mixture the alkaryl sulfonic acid.

9. A process of separating a purified oil soluble alkaryl sulfonic acid from a mixture containing as contaminants sulfur trioxide and its hydrate which comprises: (a) Adding calcium hydroxide to the crude sulfonic acid in an amount varying from 1 to 2 times the stoichiometric quantity required for the reaction with sulfur trioxide and the hydrate of the same, and then (b) Recovering from the resulting mixture the alkaryl sulfonic acid.

10. A process of separating a purified oil soluble alkaryl sulfonic acid from a mixture containing as contaminants sulfur trioxide and its hydrates which comprises: (a) Adding barium carbonate to the crude sulfonic acid in an amount varying from 1 to 2 times the stoichiometric quantity required for the reaction with sulfur trioxide and the hydrate of the same, and then (b) Recovering from the resulting mixture the alkaryl sulfonic acid.

11. A process of separating a purified oil soluble alkaryl sulfonic acid from a mixture containing as contaminants sulfur trioxide and its hydrate which comprises: (a) Adding calcium hydroxide to the crude sulfonic acid in an amount varying from 1 to 2 times the stoichiometric quantity required for the reaction with the sulfur trioxide and hydrate of the same contained in said crude sulfonic acid, and adding urea to the crude sulfonic acid in an amount varying from 1 to 2 times the stoichiometric quantity required for the reaction with the sulfur dioxide and the hydrate of the same contained in said crude sulfonic acid, and then (b) Recovering from the resulting mixture the alkaryl sulfonic acid.

12. A process of separating a purified oil soluble alkaryl sulfonic acid from a mixture containing as contaminants sulfur trioxide and its hydrate which comprises: (a) Adding calcium hydroxide to the crude sulfonic acid in an amount varying from 1 to 2 times the stoichiometric quantity required for the reaction with the sulfur trioxide and hydrate of the same contained in said crude sulfonic acid, and adding benzamide to the crude sulfonic acid in an amount varying from 1 to 2 times the stoichiometric quantity required for the reaction with the sulfur dioxide and the hydrate of the same contained in said crude sulfonic acid, and then (b) Recovering from the resulting mixture the alkaryl sulfonic acid.

References Cited in the file of this patent

UNITED STATES PATENTS

| | | |
|---|---|---|
| 2,271,635 | Flett | Sept. 25, 1935 |
| 2,453,690 | Bray | Oct. 23, 1944 |
| 2,559,439 | Jones et al. | July 3, 1951 |
| 2,760,970 | Le Suer | Aug. 28, 1956 |
| 2,807,642 | Bloch et al. | Sept. 24, 1957 |
| 2,810,745 | Wolski | Oct. 22, 1957 |